United States Patent [19]

Takagi et al.

[11] Patent Number: 4,664,232

[45] Date of Patent: May 12, 1987

[54] BRAKE DEVICE FOR ROBOT ARM

[75] Inventors: Takeo Takagi; Yuji Sakaguchi; Yoshinori Imamura, all of Kodaira, Japan

[73] Assignee: Bridgestone Corporation, Japan

[21] Appl. No.: 706,417

[22] Filed: Feb. 27, 1985

[30] Foreign Application Priority Data

Apr. 25, 1984 [JP] Japan .................. 59-83434
Jun. 28, 1984 [JP] Japan .................. 59-131842

[51] Int. Cl.$^4$ .................. F16D 49/00; F16J 3/00
[52] U.S. Cl. .................. 188/74; 92/90; 188/364; 414/4; 901/15; 901/22
[58] Field of Search .................. 188/74, 361, 362, 363, 188/364, 365, 366, 367, 368, 369, 370; 92/89, 90, 91, 92, 94; 901/15, 21, 22, 28, 29, 49, 50; 414/4, 7; 267/64.16

[56] References Cited

U.S. PATENT DOCUMENTS

| | | | |
|---|---|---|---|
| 2,128,387 | 8/1938 | Wehr | 188/74 |
| 2,645,838 | 7/1953 | Lambach | 188/74 |
| 2,940,550 | 6/1960 | Mathews | 188/74 |
| 3,215,339 | 11/1965 | Jackson | 267/64.16 X |
| 4,531,884 | 7/1985 | Russell | 901/15 X |

FOREIGN PATENT DOCUMENTS

| | | | |
|---|---|---|---|
| 0068770 | 1/1983 | European Pat. Off. | 901/22 |
| 0123558 | 10/1984 | European Pat. Off. | 92/90 |
| 1210268 | 2/1966 | Fed. Rep. of Germany | |
| 1811613 | 7/1970 | Fed. Rep. of Germany | |
| 5240378 | 3/1973 | Japan | |
| 396531 | 1/1966 | Switzerland | |

Primary Examiner—George E. A. Halvosa
Assistant Examiner—Matthew C. Graham
Attorney, Agent, or Firm—Sughrue, Mion, Zinn, Macpeak and Seas

[57] ABSTRACT

A brake device for use in an arm of a robot or manipulator comprises a brake drum, a lever pivotally supported at its intermediate portion, a brake shoe provided on the lever between its pivotally supported point and its one end, a pneumatic actuator axially contractible upon applying internal pressure thereinto and having a movable end connected to the one end or the other end of the lever, and a spring connected to one end of the lever not connected to the actuator so as to operate to elongate the actuator. This brake device is remarkably small-sized and of light-weight and consumes only small amount of fluid pressure to contribute economy of energy in comparison with prior art brake devices. The brake device according to the invention is applicable to a robot arm comprising a rotating member connected to the brake drum so as to rotate together, and two elastic actuators whose one ends are connected to a stationary member and the other are connected to each other through the rotating member in a manner to rotate the rotating member by contraction of the one actuator and simultaneous extension of the other actuator. At least one of the actuators is a pneumatic actuator axially contractible upon applying internal pressure thereinto.

5 Claims, 16 Drawing Figures

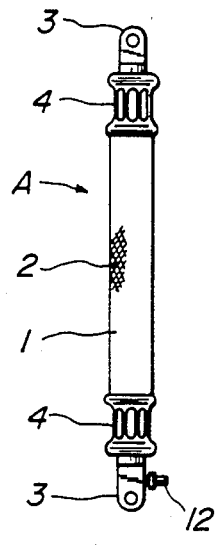
FIG_2a
PRIOR ART
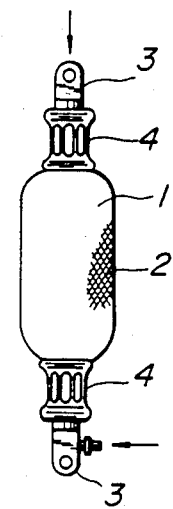
FIG_2b
PRIOR ART

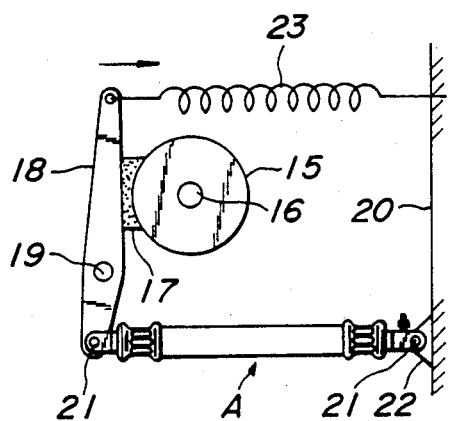
FIG_3
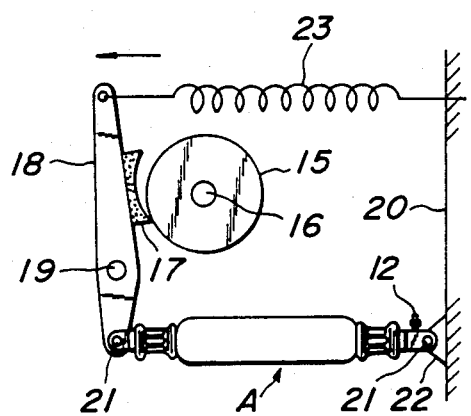
FIG_4

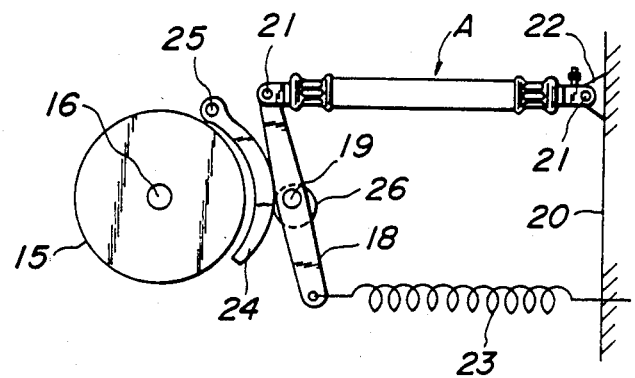
FIG_7
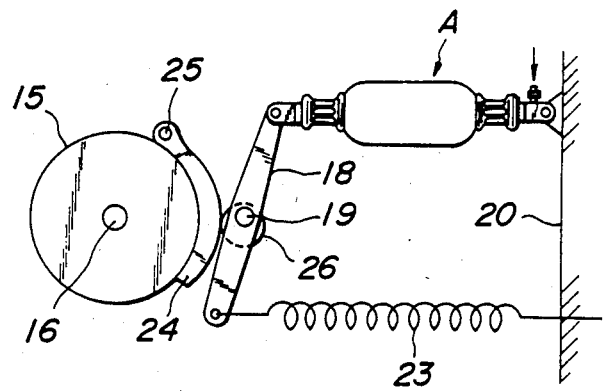
FIG_8

FIG_10
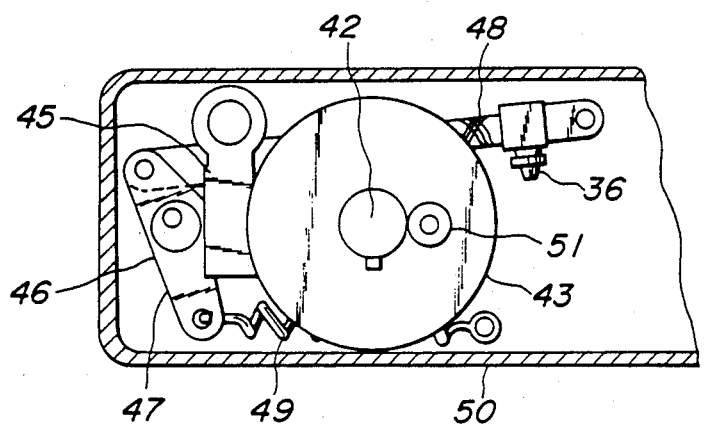
FIG_11a
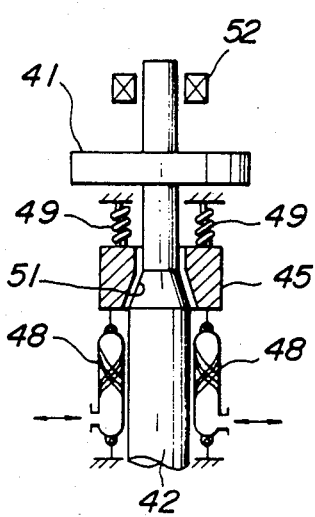
FIG_11b
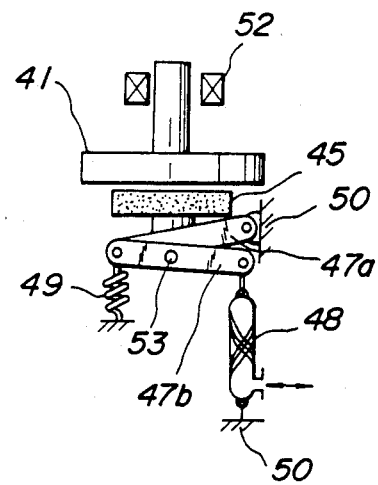

FIG_12
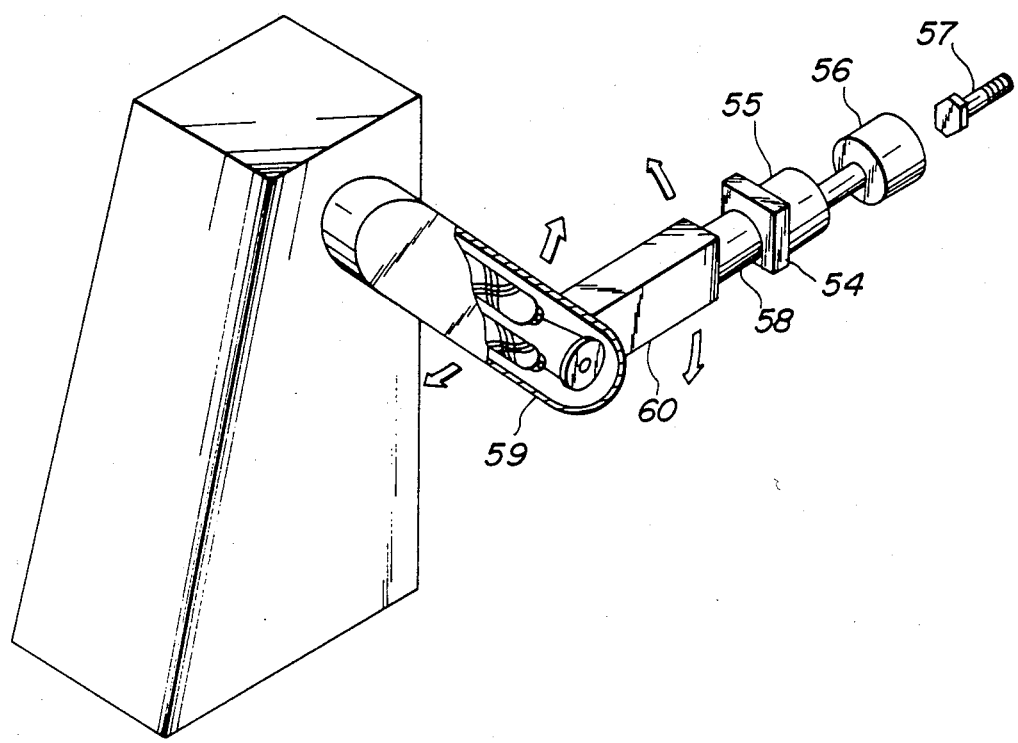

BRAKE DEVICE FOR ROBOT ARM

BACKGROUND OF THE INVENTION

1. Field of the Invention:

This invention relates to a brake device including an actuator elastically contractible in its axial direction upon applying internal pressure for actuating the brake device. More particularly this invention relates to a brake device suitable for use in arms for robots or manipulators.

2. Description of the Prior Art:

Brake devices for use in robot arms have been known. For example, a brake device including a pneumatic piston and cylinder assembly has been used. With such a brake device, a lever is pivotally supported at its mid portion and has one end loaded by a spring and the other end connected to the pneumatic piston and cylinder assembly. When the piston and cylinder assembly is extended or retracted, a brake shoe secured to the lever is urged against a brake drum connected to a pulley or rotating body, thereby restraining or braking its rotating movement. In order to urge the brake shoe to the brake drum against the spring force of the spring acting on the one end of the lever to produce required braking force, the piston and cylinder assembly must exert a great force on the other end of the lever provided with the brake shoe. For this purpose, the piston and cylinder assembly is needed to have a large diameter cylinder bore which makes the piston and cylinder assembly, itself bulky and heavy.

A brake device using such a bulky and heavy piston and cylinder assembly is expensive to manufacture and difficult to handle and consumes a great amount of pressurized fluid. It has been expected for many years to provide a brake device particularly for use in a robot arm, which is light and small-sized and easy to treat and consumes a small amount of compressed air.

There have been various kinds of actuators for robot arms. Pneumatic actuators among them have been accepted because they are susceptible to overload and high in safety for humans bodies and do not suffer from heating due to their deformation. However, most of pneumatic actuators hitherto used are pneumatic piston and cylinder assemblies usually made of iron which are excessively heavy in comparison with their operating forces.

On the other hand, actuators of air bag type have been also known. In this case, contractive forces resulting from expanded diameters upon applying control pressures into the actuators are used as operating forces for robot arms. Such actuators are of light weight and do not include sliding parts and therefore do not suffer from difficulties due to friction and air leakage.

For example, a wire extends about a pulley rotatably supported by one end of a frame, and both ends of the wire are connected to one end of the above mentioned actuators, respectively, whose other ends are pivotally connected to a suitable stationary member. With this arrangement, internal pressure is supplied into one pneumatic actuator and exhausted from the other actuator to rotate the pulley.

However, such a pneumatic actuator encounters a difficulty in control due to fine vibration or oscillation resulting from the inherent elasticity of the actuator itself. For example, when the pulley or a member fixed to the actuators is held in place after the pulley or the member has been rotated by a desired angular displacement, the actuators often go into fine oscillation. Moreover, if the pressurized fluid is inadvertently exhausted from the pneumatic actuators, the driving device for the robot arm is not longer restrained, so that it will be moved unintentionally to cause further trouble.

SUMMARY OF THE INVENTION

It is a primary object of this invention to provide a brake device which eliminates the above disadvantages and is small-sized and of light weight and which consumes only a small amount of pressurized fluid to contribute economy of energy.

It is another object of this invention to provide a brake device applicable to an arm of a robot or manipulator, so that the arm can be held in place at an end of its movement without undergoing fine vibration or oscillation and can rapidly move upon applying internal pressure without delay and is capable of easily changing its compliance depending upon various uses.

In order to achieve these objects, the brake device including a brake drum and a brake shoe urged against the brake drum to brake it according to the invention, comprises a lever pivotally supported at its substantially intermediate portion for urging said brake shoe to said brake drum, and elastic actuator axially contractible upon applying internal pressure thereinto and having a movable end connected to one end of said lever, and a spring connected to the other end of said lever so as to operate to elongate said actuator.

A preferred embodiment of the invention the actuator is a pneumatic actuator comprising a thin-wall inner cylinder made of a rubber-like elastic material and a reinforcing braided structure extensibly and contractibly surrounding the inner cylinder, the actuator being contracted in its axial direction to obtain contractive force when the internal pressure is supplied into the inner cylinder to expand it in its radial direction, while changing braided angles of the braided structure.

In one embodiment of the invention, the brake shoe is provided on the lever between its pivotally supported point and the other end connected to the spring or the one end connected to the actuator.

In another preferred embodiment of the invention, the brake shoe is pivotally supported at its one end and an eccentric cam is fixed to the lever in a manner to increase a distance between the pivoted point of the lever and a contact point of the eccentric cam with the brake shoe when the brake shoe is being urged to the brake drum to form a booster for magnifying the force urging the brake shoe to the brake drum.

According to the invention, the brake device above mentioned is incorporated in a robot arm comprising a rotating member connected to the brake drum so as to rotate together, and two elastic actuators whose one ends are connected to a stationary member and the others are connected to each other through the rotating member in a manner to rotate the rotating member by contraction of the one actuator and simultaneous extension of the other actuator, at least one of the actuators being a pneumatic actuator axially contractible upon applying internal pressure thereinto.

The invention will be more fully understood by referring to the following detailed specification and claims taken in connection with the appended drawings.

BRIEF DESCRIPTION OF THE DRAWINGS

FIG. 2a is a front elevation illustrating the actuator in FIG. 1 under an extended condition;

FIG. 2b is a front elevation similar to FIG. 2a but illustrating the actuator in a contracted condition;

FIG. 3 is a schematic plan view of a brake device of a first embodiment of the invention;

FIG. 4 is a schematic plan view of the brake device shown in FIG. 3 for explaining its operation;

FIG. 7 is a schematic plan view of a brake device of a third embodiment of the invention;

FIG. 8 is a schematic plan view of the brake device shown in FIG. 7 for explaining its operation;

FIG. 10 is a partial sectional view showing a part of the arm housing the device shown in FIGS. 9a and 9b;

FIG. 11a illustrates another brake device applicable to the arm shown in FIGS. 9a and 9b;

FIG. 11b illustrates a further brake device applicable to the arm shown in FIGS. 9a and 9b;

FIG. 12 is a perspective view of a bolt-tightening robot incorporating therein the device shown in FIGS. 9a and 9b.

DETAILED DESCRIPTION OF THE PREFERRED EMBODIMENT

Figure 1:
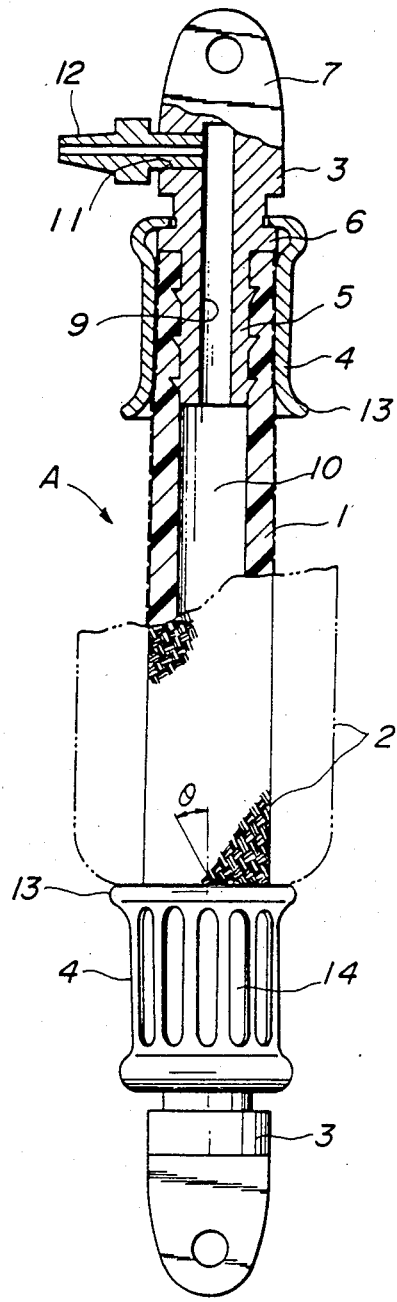
FIG. 1 is a front elevation, partially in section, of an actuator to be used in the brake device according to the invention.

An actuator elastically contractible in its axial direction upon applying internal pressure has been known as disclosed in Japanese Patent Application Publication No. 40,378/77 shown in FIG. 1.

The actuator A shown in FIG. 1 comprises a thin-wall inner cylinder 1, a reinforcing braided structure 2 arranged on an outer surface of the cylinder 1, closure members 3 at both ends thereof and a clamp sleeve 4.

The inner cylinder 1 is preferably made of a rubber or rubber-like elastomer which is air-impermeable and flexible. However, other materials equivalent thereto, for example, various kinds of plastics may be used for this purpose.

The reinforcing braided structure 2 is somewhat similar to, for example, those conventional in pressure-resistant rubber hoses whose braided angles are approximate to the so called angle of repose (54°44'). With the braided structure of the thin-wall inner cylinder, initial braided angles $\theta$ are preferably of the order of 20° in order to obtain the above mentioned angle of repose when the braided structure is expanded in diameter to the maximum value by inner pressure filled or supplied in the inner cylinder 1. In this case, conditions when used are determined so as to permit a strain under normally used conditions to be of the order of 0.3.

The tensile force-resistant reinforcing elements used in the reinforcing braided structure 2 are organic or inorganic high tensile fibers, preferably twisted or non-twisted filament bundles of, for example, glass fibers, very fine metal wires or aromatic polyamide fibers (trade name, KEVLAR).

With a reinforcing braided structure having fairly small braided angles such as 20°, its braiding operation on an inner cylinder is not necessarily easy. For example, however, a braided structure obtained by a conventional hose braiding machine is stretched in its axial direction to be commensurate with the above initial value and is then fitted on the inner cylinder 1 under the stretched condition, thereby obtaining the desired braided structure. In this case, a suitable adhesive may be applied the outer circumference of the inner cylinder 1.

Moreover, an outer sheath of a weatherproof or injury-protective film may be preferably provided on the braided structure 2.

Each closure member 3 comprises a nipple 5 adapted to be closely fitted in each end of the inner cylinder 1 preferably with an adhesive for sealing the inner cylinder from the atmosphere, a flange 6 for positioning the closure member relative to the inner cylinder, and an eye or yoke 7 having an aperture for a connecting pin (not shown). The nipple 5 is preferably provided on its outer periphery with annular protrusions 8 each having a steep taper surface toward the eye 7 and a gentle taper surface in an opposite direction for preventing the nipple 5 from being removed. One of the closure members 3 is formed at least on one side with a connecting aperture 11 communicating with an inner cavity 10 of the inner cylinder 1 through an aperture 9 formed in the nipple 5 in its axial direction. A fitting 12 is fitted in the connecting aperture 11 of the closure member 3.

Each the clamp sleeve 4 is a cylindrical metal member engaging the flange 6 so as to cover the outer end circumference of the inner cylinder 1 and having a flare 13. The clamp sleeve 4 is partially pressed toward the nipple 5 in its radial directions to sealingly unite the closure member 3 with the inner cylinder 1. Reference numeral 14 in FIG. 1 denotes axial depressions caused by a calking tool in the process.

To the fitting 12 is connected an operating pressure source, for example, an air compressor through a line having a three-way valve (not shown). When an operating pressure P is applied into the inner cavity 10 of the inner cylinder 1 through the fitting 12, the braided structure 2 is expanded from the position shown in solid lines to that shown in phantom lines in FIG. 1 to enlarge the initial braided angles $\theta_o$ to $\theta_x$ or in a pantograph movement of the reinforcing cords of the braided structure 2 so as to cause an enlargement of the diameter of the inner cylinder 1 and a contraction in its axial direction caused thereby or a shortening a distance between the apertures of the closure members. Such a movement of the braided structure to change its braided angles is referred to herein as "pantograph movement", because the movement of rhombus patterns of elements forming the braided structure is like a movement of a pantograph. A force F of the contraction is given by the following equation (1).

$$F = P\frac{\pi}{4} d^2 \left(\frac{\sin\theta_x}{\sin\theta_0}\right)^2 \left(\frac{2}{\tan^2\theta_x} - 1\right) \text{ OR}$$
$$P\frac{\pi}{4} d^2 \frac{1}{\sin^2\theta_0} (3\cos^2\theta_x - 1)$$ (1)

FIG. 2a illustrates the actuator before the contraction and FIG. 2b after the contraction.

On the other hand, when the controlled pressure in the cavity 10 of the inner cylinder 1 is released through the three-way valve into the atmosphere, the inner cylinder 1 of course regains its length with a decrease of the braided angle $\theta_x$.

The actuator above described is able to produce a great axial contractive force about twenty times that of a conventional pneumatic cylinder with the same pressure. The brake device according to the invention successfully comprises such an actuator generating the great axial contractive force.

FIGS. 3 and 4 illustrate a first embodiment of the brake device according to the invention. The brake device comprises a brake drum 15 having a shaft 16, a shoe 17 fixed to a side edge of a lever 18 whose mid portion is pivotally mounted on a shaft 19, and an actuator A having ends respectively pivotally connected to a lower end of the lever 18 and a stationary member 20 by means of pins 21. A bracket 22 is provided on the stationary member 20. A coil spring 23 is arranged between an upper end of the lever 18 and the stationary member 20 and with its ends fixed thereto so as to elongate the actuator in its axial direction.

Figure 5:
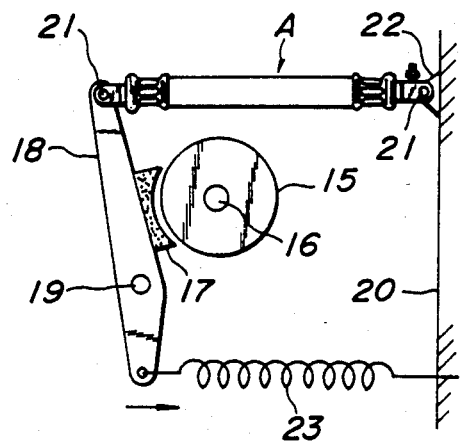
FIG. 5 is a schematic plan view of a brake device of a second embodiment of the invention.
Figure 6:
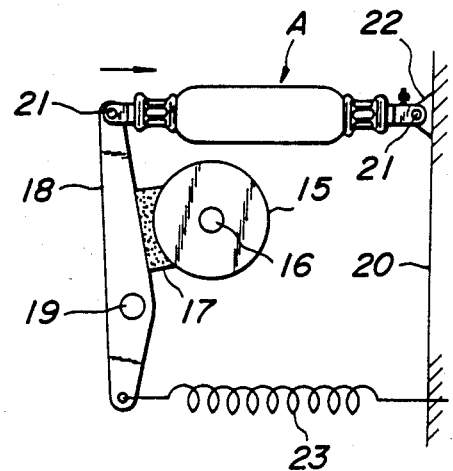
FIG. 6 is a schematic plan view of the brake device shown in FIG. 5 for explaining its operation.

FIGS. 5 and 6 illustrate a second embodiment of the brake device according to the invention, wherein like components have been designated by the same reference numerals in the previous embodiment.

The brake device of the second embodiment is substantially the same as that of the first embodiment, with exception of an actuator A pivotally connected to an upper end of a lever 18 and a stationary member 20 by means of pins 21, and a coil spring 23 arranged between a lower end of the lever 18 and the stationary member 20.

FIGS. 7 and 8 illustrate a third embodiment of the brake device according to the invention, wherein like components have been designated by the same reference numerals in the first and second embodiments.

The brake device is substantially similar to that of the second embodiment with the exception of a brake shoe 24 whose one end is pivotally supported by a pin 25 and an eccentric cam 26 fixed to a lever 18 and in contact with a convex surface of the brake shoe 24.

Operations of the first to third embodiments will be explained hereinafter.

In the first embodiment shown in FIGS. 3 and 4, when the actuator A is not subjected to internal pressure as shown in FIG. 3, the actuator A is under an elongated condition, so that the lever 18 is caused to rotate about the shaft 19 in a clockwise direction as viewed in FIG. 3 by an action of the coil spring 23 so as to urge the shoe 17 against the brake drum 15 which is under a braked condition.

In order to release the braked condition of the brake device, fluid pressure is supplied through a fitting 12 into the actuator A as shown in FIG. 4. Thus the actuator A increases in diameter of an inner cylinder 1 and shortens its axial length, so that the lever 18 is rotated about the shaft 19 in a counterclockwise direction as viewed in FIG. 4 so as to bring the shoe 17 out of contact with the brake drum 15 to release the braked condition.

The second embodiment, shown in FIG. 5 illustrates a released condition of the brake device when the actuator A is not subjected to internal pressure so as to elongate its axial length, which is different from the first embodiment. The lever 18 has been rotated in a counterclockwise direction by an action of the coil spring 23 so as to bring the shoe 17 out of contact with the brake drum 15.

In order to bring this brake device into a braked condition, internal pressure is applied into the actuator A to shorten its axial length, so that the lever 18 is rotated in a clockwise direction as viewed in FIG. 6 to urge the shoe 17 against the brake drum 15.

The third embodiment, shown in FIG. 7 illustrates a released condition of the brake device. When internal pressure is applied into the actuator A to shorten its axial length, the eccentric cam 26 is rotated together with the lever 18 about the shaft 19 to urge the brake shoe 24 against the brake drum 15 into a braked condition. In this case, when the brake shoe 24 is being moved toward the brake drum 15, a distance between the shaft 19 and a contact point of the eccentric cam with the brake shoe increases so as to magnify the force urging the brake shoe to the brake drum. In this manner, the eccentric cam forms a booster for increasing the force.

Embodiments of robot arms equipped with the brake device according to the invention will be explained hereinafter.

Figure 9A:
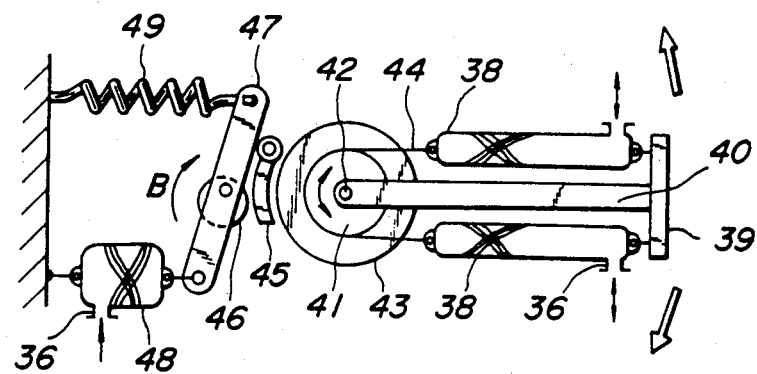
FIG. 9a is a schematic view of a robot arm provided with the brake device according to the invention.
Figure 9B:
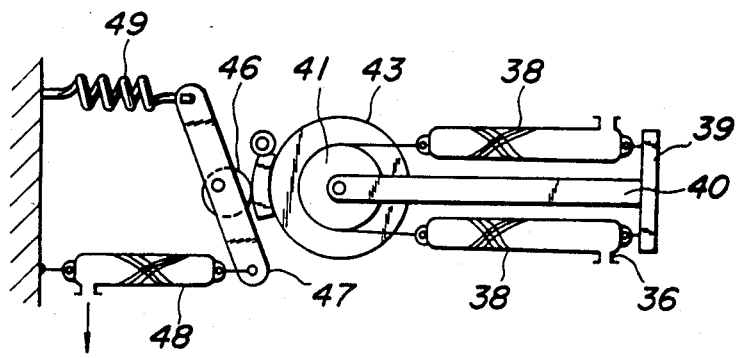
FIG. 9b is a schematic view of the robot arm shown in FIG. 9a illustrating in a braked condition.

Referring to FIGS. 9a and 9b schematically illustrating a robot arm using the brake device according to the invention, onto a frame member 40 is mounted a rotating member, for example, pulley 41 rotatably supported by a shaft 42 to which a brake drum 43 is fixed so as to be rotated together with the pulley 41. Around the pulley 41 a connecting member extends, for example, wire 44 whose ends are connected to eyes of closure members 3 of pneumatic actuators 38 similarly constructed to the actuator A shown in FIG. 1. The other ends of the pneumatic actuators 38 are pivotally connected through closure members 3 to a fixed member 39 of the frame member 40. With this arrangement, when internal pressure is supplied into one pneumatic actuator 38 and exhausted from the other actuator through fittings 36, the pulley 41 is rotated to cause the shaft 42 to rotate about its axis, so that the frame member 40 is also rotated about the shaft 42. In this manner, a robot arm is obtained which is driven by the pneumatic actuators of air bag type into and out of which compressed air is supplied and exhausted.

Moreover, a friction element, for example, a brake shoe 15 is arranged in the proximity of an outer peripheral surface of the brake drum 43. The brake shoe 45 is urged out of contact with the brake drum 43 in an operative condition and is brought into contact with the brake drum 43 in an operative condition. A brake cam or eccentric cam 46 is eccentrically fixed to a shaft of a lever 47. A separate pneumatic actuator 48 is connected to one end of the lever 47, and a tension spring 49 is connected to the other end of the lever 47. In this manner, members shown in the left in FIGS. 9a and 9b constitute the brake according to the invention. With this arrangement, when compressed air is supplied into the pneumatic actuator 48, it expands its diameter so as to produce an axial contractive force, so that the lever 47 is rotated about its pivotal shaft against contractive force of the tension spring 49 in a direction of an arrow B in FIG. 9a. As the result, the eccentric cam 46 eccentrically fixed to the lever 47 is positioned spaced from the brake shoe 45. In this embodiment, the shaft of the lever 47 is rotatably journaled in the same manner as in the shaft of the pulley 42.

The operation of the brake device thus constructed will be explained hereinafter. When the robot arm has arrived at a predetermined position through a desired movement by pressurized fluid supplied into and exhausted from the pneumatic actuators 38, the compressed air is exhausted from the pneumatic actuator 48 of the brake device. As a result, the contractive force of the tension spring 49 overcomes the contractive force of the pneumatic actuator 48 to rotate the lever 47 in a direction opposite to the direction of the arrow B. Accordingly, the eccentric cam 46 fixed to the lever 47 is also eccentrically rotated about the shaft of the lever 17 to be in contact with the brake shoe 45 to urge it against the brake drum 43. In such a braked condition, the rotation of the drum 43 and hence the shaft 42 fixed thereto is restrained, so that the pulley 41 is unable to rotate and is firmly held as shown in FIG. 9b. Therefore, the pulley does not go into fine vibration due to the elasticity of the actuators as in the prior art. In other words, as the brake device is incorporated in the robot arm having a relatively large compliance in rotating movements, the compliance of the robot arm can be changed. Even if vibration occurs due to the inherent elasticity of the pneumatic actuators, the frame member 40 is held in place because the movement of the pulley is restrained.

Furthermore, the feature of bringing the brake device into the inoperative position by exhausting of the compressed air from the pneumatic actuator of the brake device has an advantage in that even if the actuator has failed, the tension spring 49 causes the lever 47 to rotate in the direction opposite to that of the arrow B so as to bring the brake shoe 45 into contact with the brake drum 43, thereby making the robot arm inoperative. Without being limited to such a feature, however, the brake device may be constructed to bring the brake shoe into abutment against the brake drum by the pressurized fluid supplied into the actuator.

FIG. 10 illustrates one example of a robot arm comprising a brake device housed in a casing. In the drawing, a frame member 40, a pulley 41, a wire 44 and a pneumatic actuator 38 for driving the robot arm are neglected for the sake of simplicity.

In FIG. 10, moreover, a displacement meter 51, for example, rotary encoder engaging a shaft 42 of a pulley (not shown) is provided to detect rotating displacements of the pulley. A reference numeral 50 denotes the casing for enclosing the robot arm. The operation of the robot arm is identical with that of the arm shown in FIGS. 9a and 9b.

FIGS. 11a and 11b illustrate separate brake devices. In the embodiment shown in FIG. 11a, a shaft 42 of a pulley 41 is provided with a tapered portion 51 against which a brake shoe 45 is adapted to abut. One end of the brake shoe 45 is connected to tension springs 19 and the other end to pneumatic actuators 48 for driving the brake shoe 45. One end of the tension springs 49 and actuators 48 are respectfully pivotally connected to stationary members in a casing 50. Reference numeral 52 denotes a bearing journaling a shaft 42 of a pulley 41. When the pulley is operative, the pneumatic actuators 48 are not supplied with pressurized fluid, so that the tension springs 49 move the friction elements or brake shoes 45 away from the tapered portion 51 so as to permit the rotation of the pulley 41. In contrast herewith, when it is desired to hold the robot arm in a predetermined position, pressurized fluid is supplied into the pneumatic actuator 48 to produce its contractive force. When the contractive force is larger than the contractive force of the tension springs 49, the brake shoe 45 moves downward as viewed in FIG. 11a against forces of the tension springs 49 so as to abut against the tapered portion 51 to restrain the rotation of the shaft 42, thereby holding the pulley 41 in place. Furthermore, the pneumatic actuators 48 and tension springs 49 may be exchanged with each other such that the brake device is inoperative when pressurized fluid is supplied into the actuators 48 of the brake device in the same manner as in the embodiment shown in FIGS. 9a and 9b.

In another embodiment shown in FIG. 11b, a first lever 47a and a second lever 47b are pivotally connected at an end with each other. A brake shoe 45 as a friction element fixed to the first lever 47a is adapted to abut against a pulley 41 to restrain its rotation. For this purpose, the other end of the first lever 47a is pivotally connected to a stationary member such as a casing 50. To the other end of the second lever 47b is connected one end of a pneumatic actuator 48 for driving the first and second levers 47a and 47b. The other end of the actuator 48 is pivotally connected to the stationary member such as the casing 50. The levers 47a and 47b are provided with a tension spring 49 to produce a force against the action of the actuator 48.

When the pulley 41 is operative, the pneumatic actuator 48 is not supplied with pressurized fluid, so that the tension spring 49 moves the first lever 47a in a counterclockwise direction. Accordingly, the brake shoe 45 is moved away from the pulley 41 to permit its rotation. In contrast herewith, when the pneumatic actuator 48 is supplied with pressurized fluid, the second lever 47b is rotated about the pivot point 53 in the clockwise direction against the force of the tension spring 49 so as to urge the first lever 47a upward as viewed in FIG. 11b. As the result, the brake shoe 45 fixed to the first lever 47a abuts against the pulley 41 so as to restrain its rotation to hold it in place.

Moreover, electric or hydraulic means other than the pneumatic actuator may be used for driving the brake device. However, the brake device driven by the pneumatic actuator as in the above embodiments is preferable in consideration of weight, cost and piping and problems of preventing explosion and leakage of operating oil.

FIG. 12 illustrates a further embodiment of a robot for tightening bolts, which comprises a plurality of the robot arms having brake devices shown in FIG. 10. A motor 55 is mounted through a bracket 54 on a stationary member of the robot arms. To an output shaft of the motor 55 is secured a box spanner 56 adapted to fit therewithin heads of bolts 57. A feeding device 58 is operated by the motor 55 for extending and retracting the box spanner 56. Arms 59 and 60 are suitably pivotally moved or articulated as shown by arrows in FIG. 12 to bring the bolt 57 to a predetermined position. The motor 55 is then energized to tighten the bolt 57.

Figure 13:
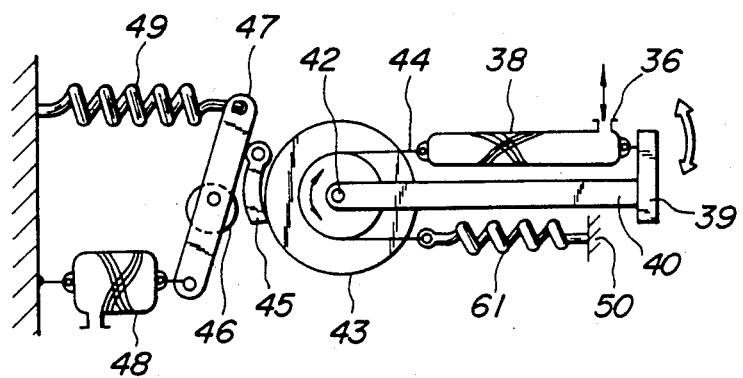
FIG. 13 is a schematic view illustrating a further robot arm provided with a brake device according to the invention.

FIG. 13 illustrates a robot arm of another embodiment of the invention. This robot arm is similar to that shown in FIGS. 9a and 9b, with exception of using a spring 61 instead of one of actuators and connecting one end of the spring 61 to a stationary member such as a casing 50 of the arm.

As can be seen from the above description, the actuator used for the brake device according to the invention exhibits axial constractive forces about twenty times those of conventional pneumatic cylinders with the same internal pressures, so that an actuator of considerably light weight having a diameter one half to one fourth smaller than those of the conventional pneumatic cylinders produces control forces substantially equivalent to those of the pneumatic cylinders. Accordingly, the brake device employing such an actuator according to the invention is remarkably small-sized and of lightweight and consumes only small amount of fluid pressure to contribute economy of energy in comparison with prior art brake devices.

According to the invention, the brake device is incorporated in the robot arm to solve inherent problems such as large compliance and tendency to undergo fine vibration due to the elasticity of the pneumatic actuator of the air bag type, thereby enabling the robot arms to be applicable within much wider range of use. In particular, when intermediate compliance values are required in fitting or copying operation, the pressure of fluid to be supplied into the actuators is adjusted to obtain the desired compliance values. In a screw tightening operation requiring lower compliance values, on the other hand, the required compliance values can be obtained with the aid of the brake device operated in good time. Moreover, the brake device comprises the pneumatic actuator so as to be brought into inoperative position upon supplying the pressurized fluid according to the invention. In the event that machines for supplying the compressed air to the respective pneumatic actuators are accidentally stopped any cause such as electric power failure or service interruption, the brake device is immediately operated to restrain any unintentional movement of the robot arm. In order to move the robot arm according to the invention, furthermore, the brake device is first operated and then released after the compressed air is supplied into the pneumatic actuators for driving the robot arm, thereby enabling the robot arm to be rapidly moved without any delay due to time required to arise the pressures in the actuators.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A brake device operable on a robot arm including a brake drum and a brake shoe urged against the brake drum to brake it, comprising; a lever pivotally supported at its substantially intermediate portion for urging said brake shoe to said brake drum, and a first elastic actuator axially contractible upon applying internal pressure thereunto and having a movable end connected to one end of said lever, a spring connected to the other end of said lever so as to operate to elongate said first actuator said robot arm comprising a rotating member connected to said brake drum to rotate together therewith, and two elastic actuators each having one end connected to a stationary member and having the other ends connected to each other through said rotating member by contraction of one of said elastic actuators and simultaneous extension of the other elastic actuator, at least one of said elastic actuators being a pneumatic actuator axially contractible upon application of internal pressure; and each of said elastic actuators comprising a pneumatic actuator having a thin-wall inner cylinder made of a rubber-like elastic material and a reinforcing braided structure extensibly and contractibly surrounding said inner cylinder, said actuator being contracted in its axial direction to obtain a contractive force when said internal pressure is supplied into said inner cylinder to expand it in its radial direction, while changing braided angles of said braided structure.

2. A brake device as set forth in claim 1, wherein said brake shoe is provided on said lever between its pivotally supported point and said other end connected to said spring.

3. A brake device as set forth in claim 1, wherein said brake shoe is provided on said lever between its pivotally supported point and said one end connected to said first actuator.

4. A brake device as set forth in claim 1, wherein said brake shoe is pivotally supported at one end and an eccentric cam is fixed to said lever in a manner to increase a distance between the pivoted point of said lever and a contact point of said eccentric cam with said brake shoe when the brake shoe is being urged to said brake drum.

5. A brake device as set forth in claim 1, further comprising a second elastic actuator connected to said brake lever wherein one of said two elastic actuators connected to said brake lever is a pneumatic actuator axially contractible upon applying internal pressure thereinto and the other is a spring.

* * * * *